United States Patent
Munko et al.

(10) Patent No.: US 11,814,051 B2
(45) Date of Patent: Nov. 14, 2023

(54) METHOD FOR DETERMINING A SIDE SLIP ANGLE DURING CORNERING OF A MOTOR VEHICLE, DRIVER ASSISTANCE SYSTEM FOR CARRYING OUT THE METHOD, AND MOTOR VEHICLE

(71) Applicant: ZF CV SYSTEMS HANNOVER GMBH, Hannover (DE)

(72) Inventors: Tobias Munko, Hannover (DE); Timo Pascal Behrens, Seelze (DE); Bernd Oldemeyer, Langenhagen (DE)

(73) Assignee: ZF CV Systems Hannover GmbH, Hannover (DE)

(*) Notice: Subject to any disclaimer, the term of this patent is extended or adjusted under 35 U.S.C. 154(b) by 175 days.

(21) Appl. No.: 17/512,411

(22) Filed: Oct. 27, 2021

(65) Prior Publication Data

US 2022/0048511 A1    Feb. 17, 2022

Related U.S. Application Data

(63) Continuation of application No. PCT/EP2020/063399, filed on May 14, 2020.

(30) Foreign Application Priority Data

May 16, 2019  (DE) ...................... 10 2019 112 900.1

(51) Int. Cl.
*B60W 30/18*    (2012.01)
*B60W 10/18*    (2012.01)
*B60W 10/20*    (2006.01)
*B60W 40/101*   (2012.01)
(Continued)

(52) U.S. Cl.
CPC .... *B60W 30/18145* (2013.01); *B60W 10/101* (2013.01); *B60W 10/18* (2013.01);
(Continued)

(58) Field of Classification Search
CPC ........... B60W 30/18145; B60W 10/18; B60W 10/20; B60W 40/101; B60W 40/114;
(Continued)

(56) References Cited

U.S. PATENT DOCUMENTS

| | | | |
|---|---|---|---|
| 6,223,116 | B1 | 4/2001 | Kin et al. |
| 2007/0173997 | A1 | 7/2007 | Shiozawa et al. |
| 2017/0038476 | A1 | 2/2017 | Unger |

FOREIGN PATENT DOCUMENTS

| | | |
|---|---|---|
| DE | 10 2006 009 682 A1 | 9/2007 |
| DE | 10 2010 050 278 A1 | 5/2012 |

(Continued)

OTHER PUBLICATIONS

Keiyu c/o K.K Honda Gijutsu Kenkyusho Kin, Translation of "wheel slip angle detecting system for a vehicle", 2006 (Year: 2006).*

(Continued)

*Primary Examiner* — Nicholas Kiswanto
*Assistant Examiner* — Jamal A Shah
(74) *Attorney, Agent, or Firm* — Walter Ottesen, P.A.

(57) ABSTRACT

A method is for determining a side slip angle during the cornering of a vehicle. The following variables are recorded and interlinked via a mathematical vehicle model with assumptions of the linear single-track model: a predetermined or measured position of the center of gravity between a front and rear axle, the current vehicle velocity, a current vehicle cornering motion variable, the current steering angle on the front axle. To simplify the determination of the side slip angle, it is determined under the assumption that the difference between the side slip angle and the Ackermann side slip angle is proportional to the difference between the Ackermann angle and the steering angle. The actual side slip angle is deduced from the relationship of the measured (Continued)

steering angle and the Ackermann angle based on the proportionality relationship of the Ackermann side slip angle theoretically present when driving through the same curve without slip.

20 Claims, 3 Drawing Sheets

(51) Int. Cl.
 *B60W 40/114* (2012.01)
 *B60W 50/00* (2006.01)
 *B60W 10/101* (2012.01)

(52) U.S. Cl.
 CPC .......... *B60W 10/20* (2013.01); *B60W 40/114* (2013.01); *B60W 2050/0033* (2013.01); *B60W 2520/125* (2013.01); *B60W 2520/14* (2013.01); *B60W 2520/20* (2013.01); *B60W 2540/18* (2013.01)

(58) Field of Classification Search
 CPC ... B60W 2050/0033; B60W 2520/125; B60W 2520/14; B60W 2520/20; B60W 2540/18
 See application file for complete search history.

(56) References Cited

FOREIGN PATENT DOCUMENTS

| DE | 10 2013 224 305 A1 | 5/2015 | | |
|----|----|----|----|----|
| DE | 10 2014 220 865 A1 | 4/2016 | | |
| EP | 0 970 876 A2 | 1/2000 | | |
| EP | 0970876 A2 * | 5/2006 | .......... | B60W 40/101 |
| EP | 1 811 308 A2 | 7/2007 | | |
| FR | 3 044 994 A1 | 6/2017 | | |

OTHER PUBLICATIONS

International Preliminary Report on Patentability dated Nov. 16, 2021 for international application PCT/EP2020/063399 on which this application is based.
Written Opinion of the International Searching Authority dated Sep. 8, 2020 for international application PCT/EP2020/063399 on which this application is based.
"Einspurmodell (Single track model)", English machine translation and Wikipedia article, https://de.wikipedia.org/w/index.php?title=Einspurmodell&oldid=187491295, downloaded on Feb. 12, 2020, 27 pages.
"Schwimmwinkel (Slip Angle)", English machine translation and Wikipedia article, http://de.wikipedia.org/w/index.php?title=Schwimmwinkel&oldid=187707679, downloaded on Feb. 12, 2020, 6 pages.
Bechtloff, J. P., "Schaetzung des Schwimmwinkels und fahrdynamischer Parameter zur Verbesserung modellbasierter Fahrdynamikregelungen", dissertation, Fortschritt-Berichte VDI, Reihe 12, Verkehrstechnik/Fahrzeugtechnik, Nr. 809, VDI Verlag GmbH, Duesseldorf, Germany, 2018, 182 pages.
International Search Report of the European Patent Office dated Sep. 8, 2020 for international application PCT/EP2020/063399 on which this application is based.

* cited by examiner

METHOD FOR DETERMINING A SIDE SLIP ANGLE DURING CORNERING OF A MOTOR VEHICLE, DRIVER ASSISTANCE SYSTEM FOR CARRYING OUT THE METHOD, AND MOTOR VEHICLE

CROSS REFERENCE TO RELATED APPLICATIONS

This application is a continuation application of international patent application PCT/EP2020/063399, filed May 14, 2020, designating the United States and claiming priority from German application 10 2019 112 900.1, filed May 16, 2019, and the entire content of both applications is incorporated herein by reference.

TECHNICAL FIELD

The disclosure relates to a method for determining a side slip angle during cornering of a motor vehicle. The disclosure also relates to a driver assistance system for carrying out the method and to a motor vehicle with such a driver assistance system.

BACKGROUND

When a motor vehicle corners, its center of gravity does not move along the vehicle's longitudinal axis. The angle between the direction of movement of the motor vehicle in the center of gravity and the longitudinal axis of the vehicle when cornering is called the side slip angle. It consists of a geometric component, which depends only on the position of the center of gravity in the vehicle and the radius of the curve, as well as the drift angle of the rear axle.

In many driving situations, the side slip angle can be used as a measure of the driving stability of the motor vehicle and driver assistance systems can be provided, for example for driving dynamics controls. For trucks in particular, many driver assistance functions are provided, the efficiency of which is improved by knowing the current side slip angle. However, the side slip angle can only be measured with great effort and is usually determined by estimation. Often, more easily measurable or already known input variables are recorded and linked via a mathematical vehicle model.

DE 10 2006 009 682 A1 discloses a method for determining the driving condition of a two-track vehicle by estimating the side slip angle by means of a mathematical model based on values currently measured on the vehicle and by means of an observer approach based on this model. With the known method, the values measured on the vehicle are the tire forces or wheel forces at least in the vehicle's transverse direction and further at least a steering angle for the two wheels of the front axle. In addition, information about the position of the vehicle's center of gravity between a front axle and a rear axle is taken into account, and the measured yaw rate or yaw acceleration as well as the longitudinal velocity of the vehicle are used for the comparison of the observer approach.

However, the tire side forces required by the known method cannot be measured or can only be measured with great effort during the operation of the vehicle.

DE 10 2010 050 278 A1 discloses a method for estimating a side slip angle with which information about input variables is linked via the assumptions of the linear single-track model, the state variable of which is ultimately the side slip angle. The input variables are the steering angle and the velocity of the vehicle. At least one other variable, namely the yaw acceleration and/or the lateral acceleration, is calculated on the basis of the mathematical model and on the basis of the measured values. When applying the single-track model, variables are also taken into account which are determined by the position of the center of gravity of the motor vehicle between a front axle and a rear axle. For the estimation of the side slip angle on the basis of the single-track model, the known method requires a new value of an unmeasured parameter, namely the drift stiffness on at least one wheel. The determination of the drift stiffness is realized by the well-known method by means of an observer approach using a Kalman filter. Finally, the side slip angle is determined with the help of the linear single-track model using the respective current values for the drift stiffness.

SUMMARY

It is an object of the disclosure to simplify the determination of the side slip angle during cornering of a motor vehicle, in particular a truck.

The aforementioned object can, for example, be achieved via a method for determining a side slip angle during cornering of a motor vehicle with the method including: detecting and linking input variables to each other via a mathematical vehicle model using assumptions of a linear single-track model, wherein the input variables include: a predetermined or measured position of a center of gravity of the motor vehicle between a front axle and a rear axle of the motor vehicle, a vehicle velocity of the motor vehicle which is current, a cornering motion variable of the motor vehicle which is current, a steering angle on the front axle which is current, determining, in the case of stable cornering of the motor vehicle, the side slip angle under an assumption that a difference between the side slip angle and an Ackermann side slip angle is proportional to a difference between an Ackermann angle and the steering angle, wherein the side slip angle is deduced from a relationship between the detected steering angle and the Ackermann angle based on a proportionality relationship of the Ackermann side slip angle which is theoretically present when driving through an identical curve without slip.

The aforementioned object can, for example, also be achieved by a driver assistance system for motor vehicles which is configured to carry out the above method for determining a side slip angle, wherein a mathematical model is predetermined for the driver assistance system with the assumptions of the linear single-track model for linking the following input variables: the predetermined or measured position of the center of gravity of the motor vehicle between a front axle and a rear axle of the motor vehicle, the current vehicle velocity of the motor vehicle, the current cornering motion variable of the motor vehicle, the current steering angle on the front axle, wherein the mathematical vehicle model for the determination of the side slip angle in stable cornering of the motor vehicle contains the assumption that the difference between the side slip angle and the Ackermann side slip angle is proportional to the difference between the Ackermann angle and the steering angle, wherein the driver assistance system is configured to deduce the actual side slip angle from the relationship of the measured steering angle and the Ackermann angle based on the proportionality relationship of the Ackermann side slip angle which is theoretically present when driving through the identical curve without slip.

The aforementioned object can, for example, also be achieved by a motor vehicle with a driver assistance system configured to carry out the above method for determining a side slip angle; wherein a mathematical model is predetermined for the driver assistance system with the assumptions of the linear single-track model for linking the following input variables: the predetermined or measured position of the center of gravity of the motor vehicle between a front axle and a rear axle of the motor vehicle, the current vehicle velocity of the motor vehicle, the current cornering motion variable of the motor vehicle, the current steering angle on the front axle, wherein the mathematical vehicle model for the determination of the side slip angle in stable cornering of the motor vehicle contains the assumption that the difference between the side slip angle and the Ackermann side slip angle is proportional to the difference between the Ackermann angle and the steering angle, wherein the driver assistance system is configured to deduce the actual side slip angle from the relationship of the measured steering angle and the Ackermann angle based on the proportionality relationship of the Ackermann side slip angle which is theoretically present when driving through the identical curve without slip.

According to the disclosure, the side slip angle in the case of stable cornering of the motor vehicle is determined under the assumption that the difference between the side slip angle and the side slip angle under Ackermann conditions, the so-called Ackermann side slip angle, is proportional to the difference between the Ackermann angle and the steering angle. Stable cornering is understood as cornering in which the determined driving dynamics variables are within a range of specified stability criteria, exceeding which can indicate an intervention in driving stability. Stable cornering can be, for example, stationary circular travel or constant circular travel, wherein changes in the values of the steering angle and/or the longitudinal velocity and/or the lateral acceleration taking into account the radius of the curve and taking into account the specified stability criteria satisfy a dynamically stable driving condition and can be treated in a quasi-stationary manner. The assumption according to the disclosure corresponds to the following equation:

$$(beta-beta0) \sim (deltaA-delta) \qquad (1)$$

with beta Side slip angle
  beta0 Ackermann side slip angle
  delta Steering angle
  deltaA Ackermann angle The Ackermann angle is the angle enclosed by the direct connections from the instantaneous pole of the curve to the front axle and the rear axle. The Ackermann side slip angle is understood to mean the side slip angle which theoretically arises when driving through the same curve without slip. The actual side slip angle is deduced from the relationship of the measured steering angle and the Ackermann angle based on the proportionality relationship of the Ackermann side slip angle. Taking into account the linear proportionality, the following relationship results of the difference between the side slip angle and the Ackermann side slip angle divided by the Ackermann side slip angle and the difference between the Ackermann angle and the steering angle divided by the Ackermann angle, from which the desired information about the side slip angle is derived:

$$(beta-beta0)/beta0 = (deltaA-delta)/deltaA => beta = beta0 + (deltaA-delta)*beta0/deltaA \qquad (2)$$

The mathematical model, which is the basis of the driver assistance system for the determination of the side slip angle, includes according to the disclosure the above assumption according to equation 2.

The disclosure has recognized that both the Ackermann angle and the Ackermann side slip angle are theoretically slip-free driving situations and can be determined with knowledge of the wheelbase and the center of gravity alone with the measured steering angle and the current cornering motion variable of the motor vehicle.

The disclosure thus provides a way to determine the side slip angle with sufficient precision during stable cornering of the motor vehicle solely on the basis of the currently measured input variables, that is, the vehicle velocity of the motor vehicle, the steering angle and a cornering motion variable of the motor vehicle.

The actual steering angle is determined, for example, by a steering angle sensor on the steering column. The preferred cornering motion variable is the variable which is already provided to the driver assistance system for other functions. For example, lateral acceleration can be determined as a suitable cornering motion variable by an ESC sensor. The information about the vehicle velocity of the motor vehicle is provided by measured values of revolution rate sensors, such as pole wheel sensors, on the wheels.

In particular, no determination of drift stiffnesses is required in the approach according to the disclosure. This is based on the practical assumption that the theoretically considered driving condition is not completely slip-free but should only be very close to the Ackermann conditions. Thus, for the determination according to the disclosure of the side slip angle, it is assumed that the equations of the linear single-track model are valid, whereby even in this theoretical driving state the ratio of the drift stiffnesses of the front and rear axles has an influence on the steering angle and side slip angle. However, since these are very close to the steering angle and side slip angle for completely slip-free driving, the approach according to the disclosure deliberately neglects this deviation.

In particular, in the determination according to the disclosure of the side slip angle during stable cornering, no separate consideration of the influence of the drift stiffness is required. By knowing the respective wheelbase and the center of gravity in the longitudinal direction of the vehicle, the steering angle and the side slip angle can be calculated from the kinematic relationships under Ackermann conditions, which would theoretically be necessary to drive through the present curve with infinitely slow (and thus slip-free) driving. This is due to the fact that the disclosure has recognized that the ratio of the drift stiffnesses is constant over the region under consideration and therefore has the same influence on the numerator and denominator in the proportionality relationship, so that knowledge of the exact drift stiffness ratio is not required. In other words, under Ackermann conditions, the steering angle and side slip angle are, in a sense, the zero point for the consideration of cornering from which the motor vehicle moves further and further away with increasing velocity. By assuming linearity of the tire properties within the scope of validity of the linear single-track model, it is always possible to deduce the actually existing side slip angle from the actually existing steering angle starting from this zero point.

The determination of the position of the center of gravity between the axles is carried out in an electronic embodiment by an electronic evaluation of measured values, for example of axle load sensors. The information about the wheelbase of the motor vehicle is fixed by the configuration and is available for determining the center of gravity.

The desired side slip angle can be determined in an easily processed relationship as the difference of a first quotient of twice the rear axle distance of the center of gravity from the rear axle divided by the radius of the curve and a second quotient of the product of the steering angle and the rear axle distance divided by the wheelbase between the front axle and the rear axle.

Since the radius of the curve in the linear single-track model is determined as the ratio of the vehicle velocity to the cornering motion variable, the following equation can be specified in an advantageous embodiment, in which the yaw rate is determined or measured as a cornering motion variable:

$$beta = 2*Lh*psipunkt/v - delta*Lh/L.$$

with Lh Rear axle distance
L Wheelbase
psipunkt Yaw rate
v Vehicle velocity

If, as an alternative to yaw rate, a lateral acceleration a is determined or measured as a cornering motion variable, the following equation is obtained for determining the desired side slip angle:

$$beta = 2*Lh*a/(v**2) - delta*Lh/L$$

with a Lateral acceleration

The driver assistance system is configured in an advantageous embodiment for the determination of active steering interventions taking into account the side slip angle. The approach according to the disclosure for determining the side slip angle in stationary cornering can provide information about the driving stability very rapidly and precisely and can calculate corresponding interventions.

In a further preferred embodiment, the driver assistance system is configured for the determination of trajectories taking into account the side slip angle.

The continuously updatable information about the side slip angle allows precise conclusions to be drawn about oversteer or understeer tendencies of the motor vehicle. Against this background, the driver assistance system according to the disclosure is configured for the detection of oversteer or understeer tendencies taking into account the side slip angle.

In cases without stable cornering, the side slip angle is determined according to a known method with observer system or integration. Preferably, the side slip angle is then determined by integrating the difference between the measured yaw rate and a value of the yaw rate which is derived from the lateral acceleration.

BRIEF DESCRIPTION OF THE DRAWINGS

The invention will now be described with reference to the drawings wherein.

DESCRIPTION OF THE PREFERRED EMBODIMENTS

Figure 1:
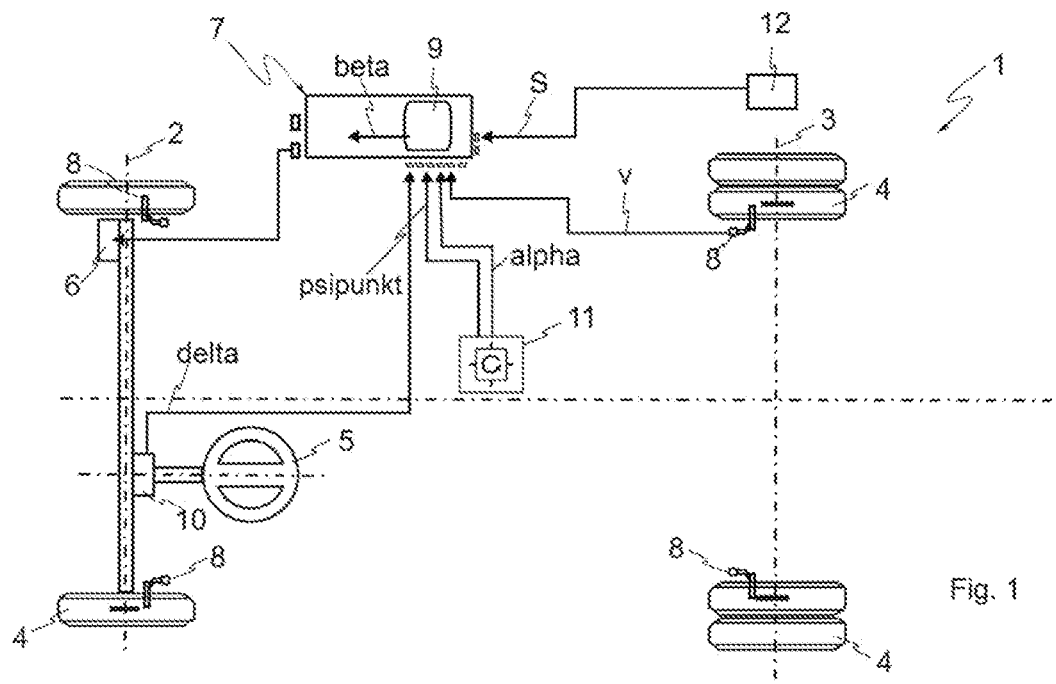
FIG. 1 shows a schematically illustrated motor vehicle with an embodiment of a driver assistance system according to the disclosure.

FIG. 1 shows a schematic view of a motor vehicle 1 with a front axle 2 and a rear axle 3, on each of which wheels 4 are arranged. The wheels 4 of the front axle 2 are steerable by means of a steering wheel 5. Each wheel 4 is equipped with a wheel brake 6, which can be individually actuated by a driver assistance system 7. The driver assistance system 7 is continuously supplied with measured values by means of dynamic vehicle parameters. The driver assistance system 7 takes into account the vehicle velocity v, which is determined from measured values of revolution rate sensors 8 of the wheels 4. In the embodiment shown, a revolution rate sensor 8 is arranged on each wheel 4, which, for example, interacts with a pole wheel and generates an electrical signal with an indication of the revolution rate.

The driver assistance system 7 determines a side slip angle beta of the motor vehicle 1 during cornering, which is used as a measure for the assessment of driving stability. In accordance with its active and/or passive work task, the driver assistance system shall base the current side slip angle beta on the determination of appropriate intervention measures in the driving stability of the motor vehicle 1. For this purpose, the driver assistance system is configured for the determination of active steering and/or braking interventions, taking into account the side slip angle beta. Advantageously, the driver assistance system 7 is configured for the detection of oversteer or understeer tendencies taking into account the side slip angle beta. For other possible work tasks, the driver assistance system 7 is configured for the determination of trajectories taking into account the side slip angle beta, for example for lane control.

For the determination 9 of the current side slip angle beta, the driver assistance system 7 is given the current steering angle delta as the input variable, which is determined from the position of the wheels 4 of the front axle 2. In the embodiment shown, the steering angle delta is detected by a steering wheel sensor 10 and is made available to the driver assistance system 7. As a further input variable, the driver assistance system 7 detects a cornering motion variable of the motor vehicle 1 relative to its center of gravity S. The cornering motion variable can be the yaw rate psipunkt or the lateral acceleration a of the motor vehicle 1. The driver assistance system 7 is assigned a lateral acceleration sensor 11, the measurement signal of which provides indications of cornering motion variables of the motor vehicle 1, in particular the yaw rate psipunkt and/or the current lateral acceleration a.

The driver assistance system 7 also takes into account the position of the center of gravity S between the axles 2, 3 as an input variable for determining the side slip angle beta. The position of the center of gravity S, which depends, among other things, on the loading of the motor vehicle, is measured as required by a detection device 12. For this purpose, for example, the measurement results of axle load sensors can be used, and the center of gravity can be determined electronically using appropriate algorithms.

Figure 2:
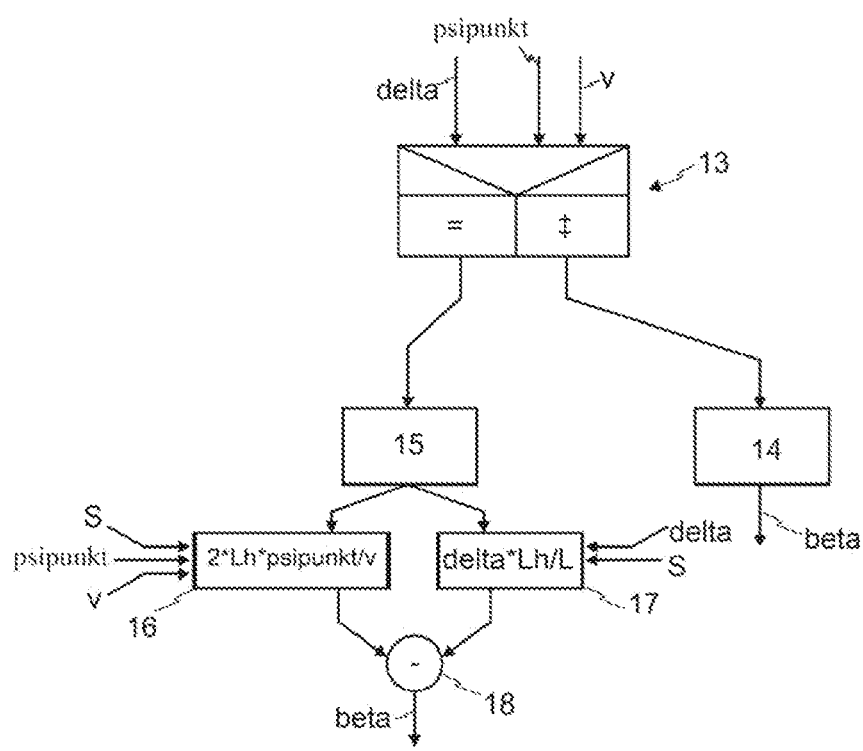
FIG. 2 shows a flow diagram of an embodiment of a method for determining a side slip angle while the motor vehicle is cornering.

The determination 9 of the side slip angle beta is shown schematically in FIG. 2. The side slip angle beta is determined during stable cornering of the motor vehicle in a manner explained below under simplifying assumptions according to the disclosure. In a first step, a stability query 13 is carried out and it is clarified whether the cornering is stable. For this purpose, a change in the input variables against time is monitored. If either the steering angle delta, the vehicle velocity v or the detected cornering motion variable (yaw rate psipunkt or lateral acceleration a) changes in such a way that the region of specified stability criteria is exited, it is assumed that the cornering is not stable. In this case, the side slip angle beta is determined by integrating 14 the difference between the measured yaw velocity psipunkt and a theoretical value of the yaw velocity, which is derived from the lateral acceleration a.

Figure 3:
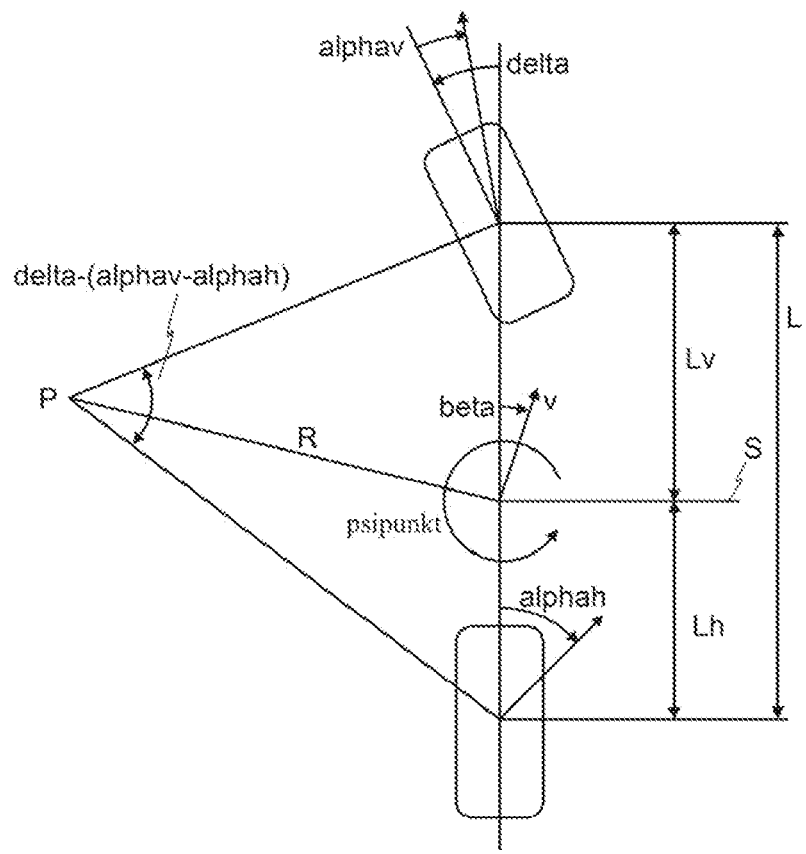
FIG. 3 shows a representation of the geometric relationships on the motor vehicle according to the single-track model.
Figure 4:
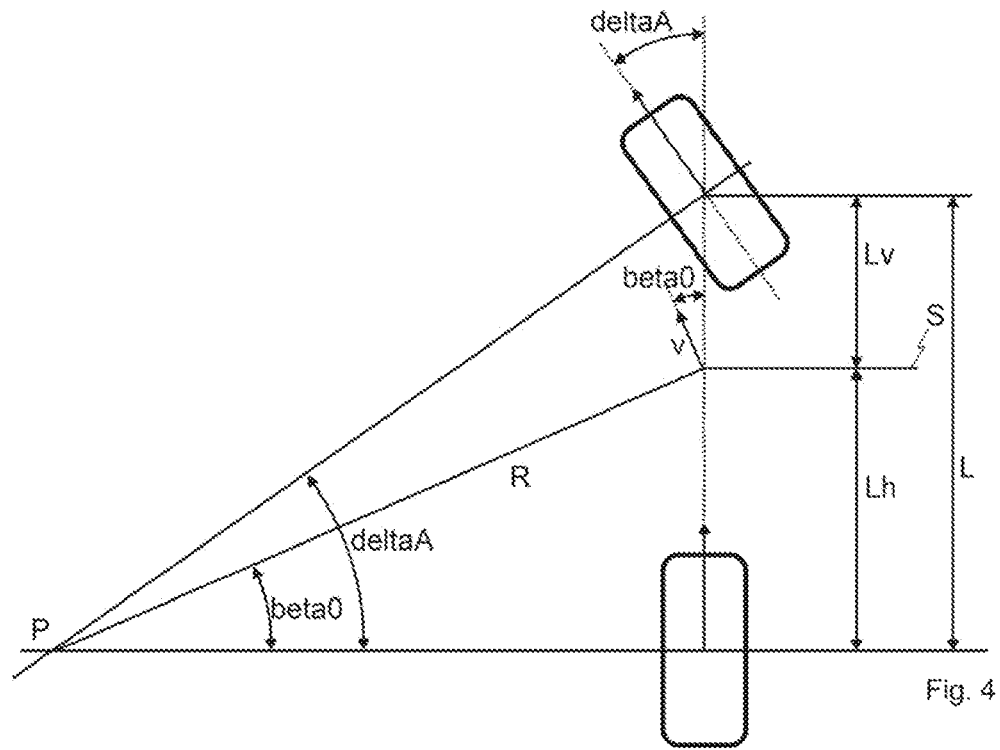
FIG. 4 shows a representation of the geometric relationships under Ackermann conditions according to the single-track model; and, FIG. 5 shows a graphical representation of the relationship between the steering angle and the side slip angle during stationary cornering.

In the case of stable cornering, the detected input variables are linked to the assumptions of the linear single-track model by means of a mathematical vehicle model 15. The angular relationships applicable in the single-track model are shown in FIG. 3 and FIG. 4. FIG. 3 shows a curve with the radius of the curve R around the instantaneous pole P, with the front wheel turned with the steering angle delta. The radius of the curve is related to the position of the center of gravity S of the motor vehicle, which is located with a rear axle distance Lh from the axle of the rear wheel. The wheelbase L, that is, the distance between the front axle and the rear axle, is structurally fixed. The radius of the curve R is determined in the single-track model as a quotient of vehicle velocity v and yaw rate psipunkt, which act at the center of gravity S. The direction of movement of the motor vehicle in the center of gravity S and the direction of the vehicle longitudinal axis when cornering define the side slip angle beta.

Since slip always occurs on the wheels during real driving, the wheels each move respectively with drift angles alphav, alphah. The drift angles are interrelated with the side slip angle beta which is ultimately to be determined. According to the single-track model, the drift angle alphah of the rear wheel is the difference between the quotient of the rear axle distance and the radius of the curve and the side slip angle beta according to the following equation:

$$alphah = Lh/(v/psipunkt) - beta.$$

However, slip does not occur under the so-called Ackermann conditions. In this situation, which FIG. 4 depicts, the front wheel is set at exactly the angle at which the imaginary extended front axle and the imaginary extended rear axle intersect at the instantaneous pole P. This steering angle is referred to as the Ackermann angle deltaA and corresponds to the quotient of the wheelbase L and the radius of the curve R. The side slip angle under Ackermann conditions, which is referred to as the Ackermann side slip angle beta0, also has no slip component.

Figure 5:
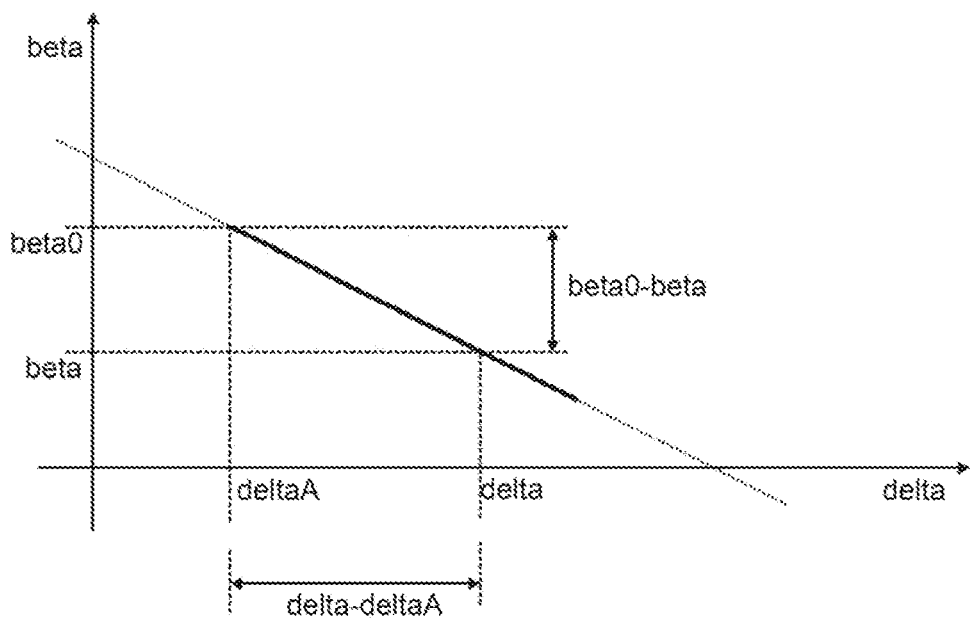

According to the disclosure, the determination of the side slip angle beta during stationary cornering can also be carried out without recording slip-related variables if the mathematical vehicle model assumes that the difference between the side slip angle beta and the Ackermann side slip angle beta0 is proportional to the difference between the Ackermann angle deltaA and the steering angle delta. This relationship is shown graphically in FIG. 5 and corresponds to the following proportionality:

$$(beta-beta0) \sim (deltaA-delta)$$

From the relationship of the measured steering angle delta and the Ackermann angle deltaA, the actual side slip angle beta sought by the method according to FIG. 2 is deduced by means of the proportionality relationship of the Ackermann side slip angle beta0 theoretically present during slip-free driving through the same curve. In this case, the disclosure makes use of the relationship presented in FIG. 5 according to the principles of the theorem of interception and assumes that the difference between the side slip angle beta and the Ackermann side slip angle beta0 divided by the Ackermann side slip angle beta0 is equal to the difference between the Ackermann angle deltaA and the steering angle delta divided by the Ackermann angle deltaA. This results in the following equation:

$$(beta-beta0)/beta0 = (deltaA-delta)/deltaA.$$

This assumption relates the differences assumed as proportional to the respective values under Ackermann conditions, wherein as is well known no slip occurs. The relationships of the steering angle and the side slip angle defined in the single-track model apply under Ackermann conditions, that is, of the Ackermann angle and the Ackermann side slip angle, so that the desired side slip angle is determined.

For the embodiment according to FIG. 2 with detection of the yaw rate psipunkt the following equation for the side slip angle results:

$$beta = 2*Lh*psipunkt/v - delta*Lh/L.$$

Thus, in the embodiment according to FIG. 2, a first quotient 16 is determined from the product of twice the rear axle distance Lh and the yaw rate psipunkt divided by the vehicle velocity v. A second quotient 17 is formed from the product of the steering angle delta and the rear axle distance Lh divided by the wheelbase L. The difference 18 between the first quotient 16 and the second quotient 17 is the desired side slip angle beta during stationary cornering.

In a second embodiment, the lateral acceleration a is determined or measured as a cornering motion variable instead of the yaw rate psipunkt. The first quotient is determined from the product of twice the rear axle distance Lh and the lateral acceleration a divided by the square of the vehicle velocity v. The side slip angle beta is then obtained according to the following equation:

$$beta = 2*Lh*a/(v**2) - delta*Lh/L.$$

It is understood that the foregoing description is that of the preferred embodiments of the invention and that various changes and modifications may be made thereto without departing from the spirit and scope of the invention as defined in the appended claims.

REFERENCE CHARACTER LIST (PART OF THE DESCRIPTION)

1 Motor vehicle
2 Front axle
3 Rear axle
4 Wheel
5 Steering wheel
6 Wheel brake
7 Driver assistance system
8 Revolution rate sensor
9 Determination
10 Steering wheel sensor
11 Lateral acceleration sensor
12 Detection device
13 Stability query
14 Integration
15 Mathematical vehicle model
16 First quotient
17 Second quotient
18 Difference
a Lateral acceleration
alpha Drift angle
alphah Drift angle of the rear wheel
alphav Drift angle of the front wheel
beta Side slip angle beta0 Ackermann side slip angle
delta Steering angle
deltaA Ackermann angle
L Wheelbase
Lh Rear axle distance
P Instantaneous pole
psipunkt Yaw rate
R Radius of the curve
S Center of gravity
V Vehicle velocity

What is claimed is:

1. A method for determining a side slip angle of a motor vehicle, the method comprising:
   detecting and linking input variables to each other via a mathematical vehicle model using a linear single-track model, wherein the input variables include:
   a predetermined or measured position of a center of gravity of the motor vehicle between a front axle and a rear axle of the motor vehicle,
   a vehicle velocity of the motor vehicle which is current,
   a cornering motion variable of the motor vehicle which is current,
   a steering angle on the front axle which is current,
   determining, in a case of stable cornering of the motor vehicle, the side slip angle during a cornering maneuver of the motor vehicle under an acceptance that a difference between the side slip angle and an Ackermann side slip angle is proportional to a difference between an Ackermann angle and the steering angle, wherein the side slip angle is deduced from a relationship between the detected steering angle and the Ackermann angle based on a proportionality relationship of the Ackermann side slip angle which is theoretically present when driving through an identical curve without slip; and,
   wherein the side slip angle is determined as a difference of a first quotient of twice a rear axle distance of the center of gravity from the rear axle divided by a radius of the curve, which is taken into account as a ratio of the vehicle velocity to the cornering motion variable, and a second quotient of the product of the steering angle and the rear axle distance divided by a wheelbase between the front axle and the rear axle.

2. The method of claim 1, wherein a yaw rate is determined or measured as the cornering motion variable.

3. The method of claim 2, wherein a lateral acceleration is determined or measured as the cornering motion variable; and, in cases without stable cornering, the side slip angle is determined by integrating a difference between the measured yaw rate and a value of the yaw rate which is derived from the lateral acceleration.

4. The method of claim 1, wherein a yaw rate is determined or measured as the cornering motion variable.

5. The method of claim 4, wherein the first quotient is determined from a product of twice the rear axle distance and the yaw rate divided by the vehicle velocity.

6. The method of claim 1, wherein a lateral acceleration is determined or measured as the cornering motion variable.

7. A driver assistance system for motor vehicles which is configured to carry out the method for determining a side slip angle of claim 1, wherein a mathematical model is predetermined for the driver assistance system with the linear single-track model for linking the following input variables:
   the predetermined or measured position of the center of gravity of the motor vehicle between a front axle and a rear axle of the motor vehicle,
   the current vehicle velocity of the motor vehicle,
   the current cornering motion variable of the motor vehicle,
   the current steering angle on the front axle,
   wherein the mathematical vehicle model for the determination of the side slip angle in stable cornering of the motor vehicle contains an acceptance that the difference between the side slip angle and the Ackermann side slip angle is proportional to the difference between the Ackermann angle and the steering angle, wherein the driver assistance system is configured to deduce the actual side slip angle from the relationship of the measured steering angle and the Ackermann angle based on the proportionality relationship of the Ackermann side slip angle which is theoretically present when driving through the identical curve without slip; and,
   wherein the side slip angle is determined as a difference of a first quotient of twice a rear axle distance of the center of gravity from the rear axle divided by a radius of the curve, which is taken into account as a ratio of the vehicle velocity to the cornering motion variable, and a second quotient of the product of the steering angle and the rear axle distance divided by a wheelbase between the front axle and the rear axle.

8. The driver assistance system of claim 7, wherein said driver assistance system is configured to determine at least one of active steering interventions and active braking interventions taking into account the side slip angle.

9. The driver assistance system of claim 7, wherein the driver assistance system is configured to determine trajectories taking into account the side slip angle.

10. The driver assistance system of claim 7, wherein the driver assistance system is configured to detect oversteer or understeer tendencies taking into account the side slip angle.

11. The driver assistance system of claim 7 further comprising:
    a non-transitory computer readable storage medium;
    a program code stored on said non-transitory computer readable storage medium; and,
    said program code being configured to carry out the method when executed by a processor.

12. The driver assistance system of claim 7 further comprising:
    a non-transitory computer readable storage medium; and,
    said mathematical model being stored on said non-transitory computer readable storage medium.

13. A motor vehicle comprising:
    a driver assistance system configured to carry out the method for determining a side slip angle of claim 1;
    wherein a mathematical model is predetermined for the driver assistance system with the assumptions of the linear single-track model for linking the following input variables:
    the predetermined or measured position of the center of gravity of the motor vehicle between a front axle and a rear axle of the motor vehicle,
    the current vehicle velocity of the motor vehicle,
    the current cornering motion variable of the motor vehicle,
    the current steering angle on the front axle,
    wherein the mathematical vehicle model for the determination of the side slip angle in stable cornering of the motor vehicle contains the assumption that the difference between the side slip angle and the Ackermann side slip angle is proportional to the difference between the Ackermann angle and the steering angle, wherein the driver assistance system is configured to deduce the actual side slip angle from the relationship of the measured steering angle and the Ackermann angle based on the proportionality relationship of the Ackermann side slip angle which is theoretically present when driving through the identical curve without slip.

14. The motor vehicle of claim 13 further comprising a plurality of sensors configured to detect the input variables.

15. The motor vehicle of claim 13 further comprising:
a non-transitory computer readable storage medium; and,
said mathematical model being stored on said non-transitory computer readable storage medium.

16. The method of claim 1 further comprising outputting a control signal configured to at least one of effect an active steering intervention taking into account the determined side slip angle, effect an active braking intervention taking into account the determined side slip angle, and set a travel trajectory taking into account the determined side slip angle.

17. A driver assistance system for motor vehicles which is configured to carry out the method for determining a side slip angle of claim 16, wherein a mathematical model is predetermined for the driver assistance system with the linear single-track model for linking the following input variables:
the predetermined or measured position of the center of gravity of the motor vehicle between a front axle and a rear axle of the motor vehicle,
the current vehicle velocity of the motor vehicle,
the current cornering motion variable of the motor vehicle,
the current steering angle on the front axle,
wherein the mathematical vehicle model for the determination of the side slip angle in stable cornering of the motor vehicle contains the acceptance that the difference between the side slip angle and the Ackermann side slip angle is proportional to the difference between the Ackermann angle and the steering angle, wherein the driver assistance system is configured to deduce the actual side slip angle from the relationship of the measured steering angle and the Ackermann angle based on the proportionality relationship of the Ackermann side slip angle which is theoretically present when driving through the identical curve without slip.

18. The method of claim 1 further comprising outputting the determined side slip angle to a vehicle control module of the vehicle as a variable for controlling the vehicle.

19. A motor vehicle comprising:
a driver assistance system configured to carry out a method for determining a side slip angle;
wherein a mathematical model is predetermined for the driver assistance system with the linear single-track model for linking the following input variables:
the predetermined or measured position of the center of gravity of the motor vehicle between a front axle and a rear axle of the motor vehicle,
the current vehicle velocity of the motor vehicle,
the current cornering motion variable of the motor vehicle,
the current steering angle on the front axle,
wherein the mathematical vehicle model for the determination of the side slip angle in stable cornering of the motor vehicle contains the assumption that the difference between the side slip angle and the Ackermann side slip angle is proportional to the difference between the Ackermann angle and the steering angle, wherein the driver assistance system is configured to deduce the actual side slip angle from the relationship of the measured steering angle and the Ackermann angle based on the proportionality relationship of the Ackermann side slip angle which is theoretically present when driving through the identical curve without slip;
a non-transitory computer readable storage medium;
a processor;
a program code stored on said non-transitory computer readable storage medium; and,
said program code being configured, when executed by said processor, to:
detect and link input variables to each other via a mathematical vehicle model using assumptions of a linear single-track model, wherein the input variables include a predetermined or measured position of a center of gravity of the motor vehicle between a front axle and a rear axle of the motor vehicle, a vehicle velocity of the motor vehicle which is current, a cornering motion variable of the motor vehicle which is current, and a steering angle on the front axle which is current;
determining, in the case of stable cornering of the motor vehicle, the side slip angle under an acceptance that a difference between the side slip angle and an Ackermann side slip angle is proportional to a difference between an Ackermann angle and the steering angle, wherein the side slip angle is deduced from a relationship between the detected steering angle and the Ackermann angle based on a proportionality relationship of the Ackermann side slip angle which is theoretically present when driving through an identical curve without slip.

20. The vehicle of claim 19, wherein said program code is further configured, when executed by said processor, to output a control signal configured to at least one of: effect an active steering intervention taking into account the determined side slip angle, effect an active braking intervention taking into account the determined side slip angle, and set a travel trajectory taking into account the determined side slip angle.

* * * * *